United States Patent [19]
Razote

[11] Patent Number: 4,627,188
[45] Date of Patent: Dec. 9, 1986

[54] FISHING ROD ASSEMBLY

[76] Inventor: Regino V. Razote, 6747 Birch Trace, Pineville, La. 71360

[21] Appl. No.: 797,124

[22] Filed: Nov. 12, 1985

[51] Int. Cl.⁴ ........................................ A01K 89/017
[52] U.S. Cl. ........................................ 43/21; 43/22; 43/24
[58] Field of Search ............... 43/21, 18.1, 18.5, 19, 43/24, 20, 22; 242/84.1 A, 215

[56] References Cited

U.S. PATENT DOCUMENTS

| | | | |
|---|---|---|---|
| 2,190,398 | 2/1940 | Bugatti | 43/21 |
| 2,262,637 | 11/1941 | Fanshier | 43/21 |
| 2,541,876 | 2/1951 | Lockwood | 43/21 |
| 2,729,012 | 1/1956 | Lee | 43/24 |
| 3,075,722 | 1/1963 | Stealy | 242/84.1 A |
| 3,116,892 | 1/1964 | Pickard | 43/21 |
| 3,248,819 | 5/1966 | Stealy | 242/84.1 A |
| 3,862,509 | 1/1975 | Petersen | 43/24 |
| 3,932,954 | 1/1976 | Wyroski | 43/21 |
| 4,212,126 | 7/1980 | Barnett | 43/24 |
| 4,283,025 | 8/1981 | Whisenhunt | 43/21 |

Primary Examiner—Gene P. Crosby
Attorney, Agent, or Firm—John M. Harrison

[57] ABSTRACT

A fishing rod assembly which includes a flexible, hollow fishing rod attached to one end of a reel mount which is shaped to receive a reel pod, and a handle attached to the opposite end of the reel mount for handling the fishing rod. The reel pod is further characterized by a shaped housing having a pair of removable end caps and containing an electric motor provided with a drive bevel gear in engagement with the bevel gear of a cooperating spool containing a supply of fishing line. The fishing line is wound on the spool and extends through apertures in the front end cap and the reel mount, and then through the hollow interior of the fishing rod to exit the end of the rod for tying to a lure. An optional reel handle is provided for engagement with the spool, and the fishing line can be wound on the spool in conventional fashion to retrieve the lure. Electrical connections and a source of electricity are provided for driving the electric motor responsive to manipulation of a switch provided on the handle of the fishing rod assembly, whereby the fishing line can be played out by casting or simply unwinding from the spool, and can then be retrieved by manipulating the switch to an appropriate position.

11 Claims, 11 Drawing Figures

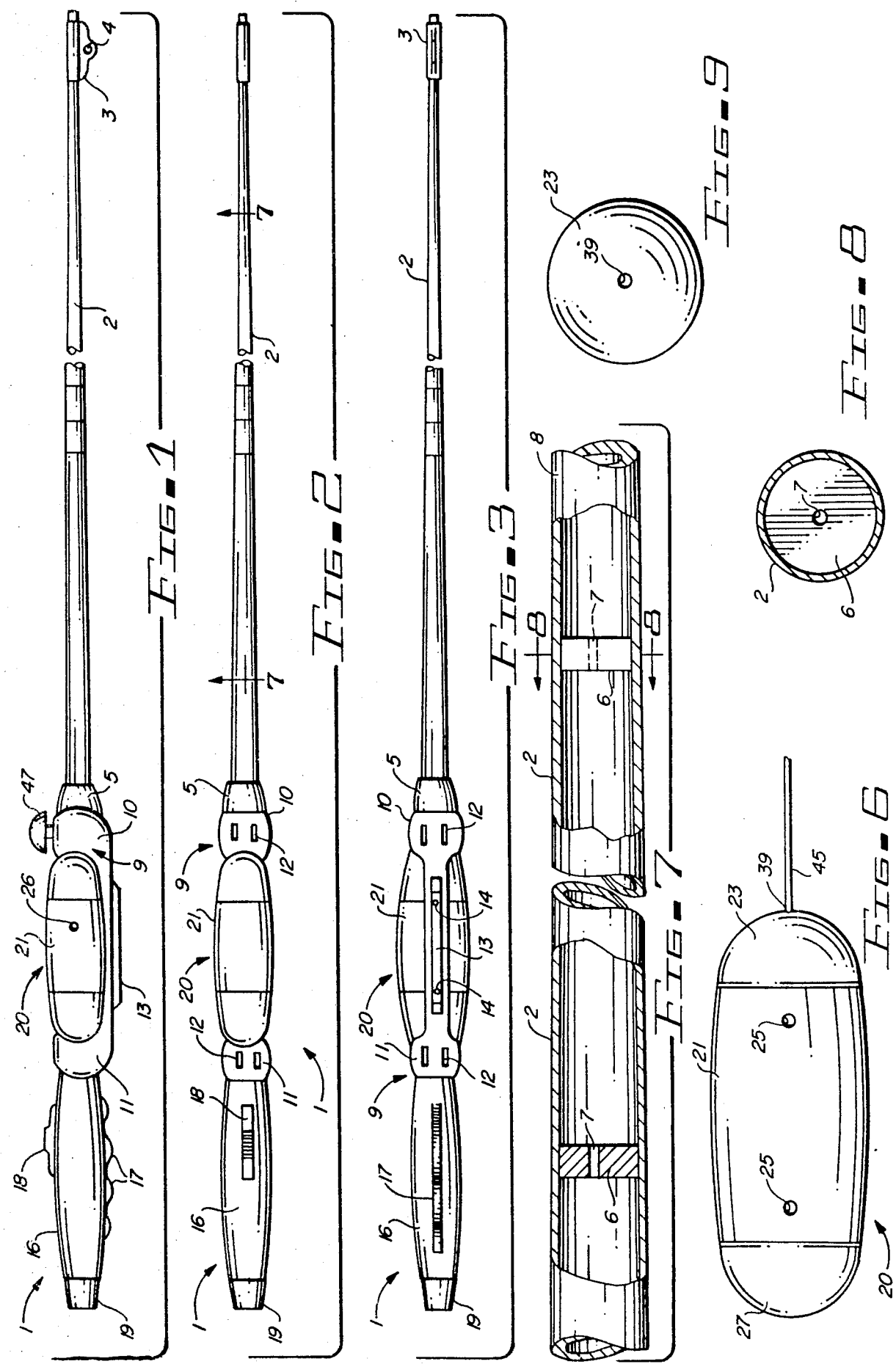

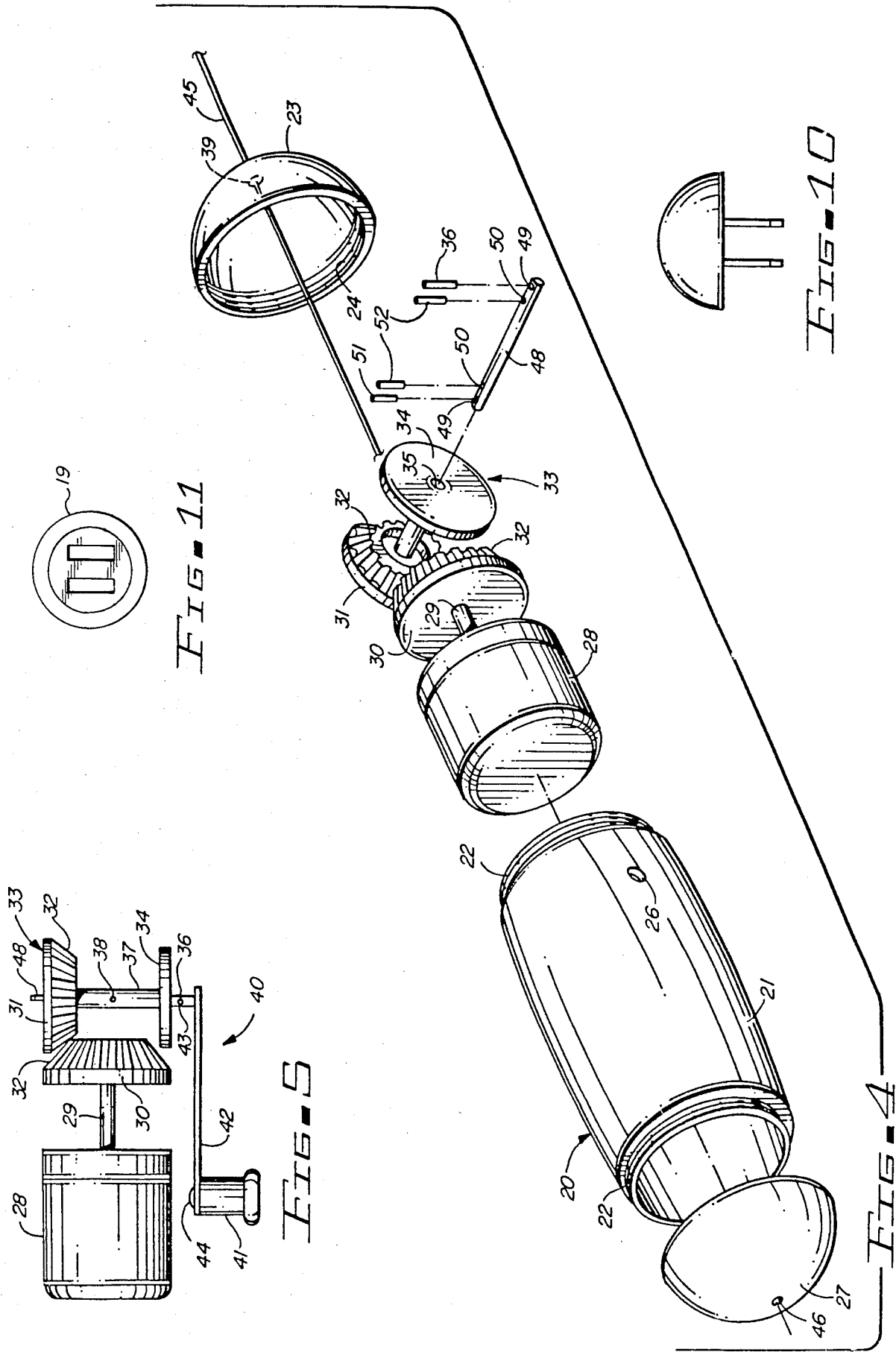

FISHING ROD ASSEMBLY

BACKGROUND OF THE INVENTION

1. Field of the Invention

This invention relates to fishing rods and reels, and more particularly, to a fishing rod assembly which is characterized by a flexible fishing rod attached to one end of a reel mount provided with a rearwardly extending handle and containing a removable reel pod for automatic extension and retrieval of fishing line stored in the reel pod. In a preferred embodiment of the invention the reel pod contains an electric motor provided with a drive bevel gear which engages a secondary spool bevel gear comprising part of a spool assembly containing a supply of fishing line. The fishing line is wound on the spool and extends through the forward end of the reel pod and the reel mount, through the interior of the fishing rod and from the tip of the rod, to receive a lure. The fishing rod assembly handle is further provided with a switch which is in electrical cooperation with either a battery or a source of alternating electric current, and with the motor located inside the reel pod to cause the line wound on the spool to either extend from or wind upon the spool, depending upon the position of the switch. Accordingly, casting can be aided by manipulating the switch in the "unwind" configuration as the rod is activated in the casting configuration to aid in paying of the line from the spool. Conversely, manipulation of the switch in the opposite position rewinds the line on the spool as an aid in playing a fish or retrieving the lure. An optional reel handle is provided with the fishing rod assembly of this invention for removable engagement with the spool mechanism in order to retrieve the line, lure and fish in conventional fashion, if needed. Furthermore, an optional light is also provided for engagement with the fishing rod assembly to facilitate night fishing, as desired.

2. Description of the Prior Art

Conventional fishing rods and reels are generally characterized by flexible rods attached either permanently or removable to a reel handle, which is in turn fitted with a mechanical coupling means for receiving and mounting reels of various description. Typically, these reels are of the "open-face" or "closed-face" design, and are provided with a mechanical spool-release mechanism of some description which is designed to permit the spool to freely rotate as the rod is grasped and whipped through in a casting motion to facilitate unwinding of the line from the reel for accurate casting of a lure. Such reels are also typically provided with a handle means for retrieving the line and lure after the casting operation is completed, and in some instances, the handle means can be positioned on either side of the reel to provide either a right-handed or a left-handed wind, as desired.

Conventional fishing rods are usually fitted with multiple eyes attached to the top or bottom of the rod, depending upon whether the rod is designed for "open-face" or "closed-face" reels, and the fishing line is threaded through these eyes to allow smooth and unimpeded casting and retrieval of a lure. Such rods are generally manufactured of fiberglass or carbon-impregnated materials for maximum flexibility and strength, and may be provided in a variety of shapes and sizes, depending upon the size of the fish to be caught. Similarly, the reel mechanisms are likewise designed in a variety of shapes and sizes to accomodate rods of varying design, depending upon the size of the fish sought.

It is an object of this invention to provide a new and improved fishing rod assembly which is characterized by an electrically-operated spool mechanism for automatically retrieving the fishing line and lure and for aiding in the casting or unwinding of the fishing line from the spool.

Another object of this invention is to provide a fishing rod assembly which is characterized by a flexible fishing rod attached to a reel holder or mount and having a handle for manipulating the rod, and further including an electrically-operated line retrieval and dispensing spool mechanism containing a supply of fishing line, which line is oriented through the center of the fishing rod for ease in retrieval and casting of a lure attached to the end of the line.

Yet another object of this invention is to provide a new and improved fishing rod assembly which is characterized by a hollow, flexible fishing rod of desired size, which is removably attached to one end of a reel mount provided with a handle, and further including a reel pod containing an electric motor which is geared to a spool mechanism containing a supply of fishing line, whereby the electric motor can be activated to aid in unwinding the line from the spool during casting or deployment of a lure and retrieval of the line on the spool when the lure is retrieved.

Yet another object of the invention is to provide a fishing rod assembly which includes a flexible, hollow fishing rod attached to one end of a reel mount which carries a hollow handle and a reel pod characterized by a housing containing an electrically-operated spool mechanism carrying a supply of fishing line, which line is deployed through the forward end of the housing and the reel mount, and through the hollow interior of the fishing rod for automatic deployment of a lure during casting, and retrieval of the lure on the spool responsive to manipulation of a switch means located on the handle and in electrical cooperation with the motor.

SUMMARY OF THE INVENTION

These and other objects of the invention are provided in a fishing rod assembly which is characterized by a hollow, flexible fishing rod attached to a rod mount provided with a handle and removably receiving a reel pod. The reel pod is further characterized by a housing containing an electric motor and a spool means in engagement with a drive gear on the electric motor, the spool means further containing a supply of fishing line which extends through the forward end of the housing and the reel mount and then through the hollow interior of the rod. A switch means is also located on the fishing rod assembly handle in electrical cooperation with the motor. The fishing rod assembly is used in cooperation with a battery or a source of alternating electric current for selectively driving the spool mechanism in the forward or reverse direction to cast or retrieve a lure secured to the end of the fishing line, responsive to manipulation of the switch means. In a preferred embodiment of the invention the fishing rod assembly is further provided with an optional reel handle for removable engagement with the spool mechanism to retrieve the lure in conventional fashion. An optional light is also included for engagement with the reel mount to better facilitate night fishing.

BRIEF DESCRIPTION OF THE DRAWING

The invention will be better understood by reference to the accompanying drawing wherein:

FIG. 1 is a side elevation of a preferred embodiment of the fishing rod assembly of this invention;

FIG. 2 is a top elevation of the fishing rod assembly illustrated in FIG. 1;

FIG. 3 is a bottom elevation of the fishing rod assembly illustrated in FIGS. 1 and 2;

FIG. 4 is an exploded, perspective view of a preferred line retrieval and dispensing reel pod mechanism element of the fishing rod assembly of this invention;

FIG. 5 is a top elevation of a preferred electric motor and spool drive mechanism with optional reel handle attached;

FIG. 6 is a bottom elevation of a preferred assembled reel pod of the fishing rod assembly of this invention;

FIG. 7 is a side sectional view, taken along lines 7—7 in FIG. 2, of the fishing rod element;

FIG. 8 is an end sectional view, taken along lines 8—8 in FIG. 7, of the fishing rod element;

FIG. 9 is a front elevation of the front end cap of the reel pod illustrated in FIGS. 5 and 6; and FIG. 10 is a side elevation of an optional light for use with the fishing rod assembly of this invention.

FIG. 11 is an end view of the handle cap with a plug receptacle therein.

DESCRIPTION OF THE PREFERRED EMBODIMENTS

Referring to FIGS. 1-3 of the drawings the fishing rod assembly of this invention is generally illustrated by reference numeral 1, and in a preferred embodiment, includes a fishing rod generally illustrated by reference numeral 2. The fishing rod 2 is provided with a rod tip 3 with a tip aperture 4, and is secured to the rod mount base 10 of a reel mount 9, by means of a rod mount 5. The rod mount base 10 carries the rod mount 5, and a handle base 11 on the opposite end of the reel mount 9, carries a handle 16. As illustrated in FIGS. 2 and 3, plug receptacles 12 are provided in both the rod mount base 10 and handle base 11 to provide a source of electricity to the fishing rod assembly 1, as hereinafter described. As is particularly illustrated in FIG. 3, a mount plate 13, with cooperating mount bolts 14, serve to removably secure a reel pod 20 into position on the reel mount 9 and nested between the rod mount base 10 and handle base 11, as illustrated. In a most preferred embodiment of the invention, the handle 16 is hollow and is provided with a handle grip 17 on the underside thereof for receiving the four fingers of one hand, a switch 18 is slidably attached to the top of the handle 16 for electrically controlling the line retrieval and dispensing spool mechanism located within the reel pod 20, and a handle cap 19 is threadably attached to the handle 16 for battery storage, as hereinafter described.

Referring now to FIGS. 4, 5 and 9 of the drawings, in a most preferred embodiment of the invention the reel pod 20 is characterized by a generally cylindrically-shaped housing 21, provided with external housing threads 22 at each end, to threadably receive a front cap 23, fitted with internal front end threads 24, and a rear cap 27, also provided with internal threads (not illustrated). Furthermore, the front cap 23 is also provided with a front cap aperture 39, as illustrated in FIG. 9, to accommodate the fishing line 45, while the rear cap 27 is fitted with a rear cap aperture 46, to receive electrical wiring connecting the electric motor 28 to the plug receptacles 12. The electric motor 28, having a motor shaft 29, is designed to fit inside the housing 21, and a drive bevel gear 30, provided with bevel gear teeth 32, is attached to the projecting end of the motor shaft 29. The bevel gear teeth 32 of the drive bevel gear 30 are in engagement with the bevel gear teeth 32 of a cooperating spool bevel gear 31, which forms one base of a spool 33, the opposite base of the spool 33 being shaped by a non-toothed spool base 34. The spool bevel gear 31 is spaced from the spool base 34 by a hollow spool shaft 37, and the spool base 34 is further provided with a shaft pin aperture 35 for receiving a spool shaft pin 48, as illustrated in FIG. 4. The spool shaft pin 48 is provided with outside pin apertures 49 and inside pin apertures 50, and is designed to fit inside the spool shaft 37 and rotatably secure the spool 33 in the housing 21. Inside pins 52 register with inside pin apertures 50, respectively, to secure the spool shaft pin 48 in the spool 33. The projecting ends of the spool shaft pin 48 extend through the housing apertures 26, one of which housing apertures 26 is illustrated in FIG. 4, and the other aperture (not illustrated) being oppositely disposed in the housing 21. The outside pin 51 and reel handle pin 36 register with the outside pin apertures 49, respectively, to further secure the spool shaft pin 48 in the housing 21. In a preferred embodiment the hollow handle shaft 43, attached to one end of a handle arm 42 of an optional reel handle 40, is secured to the spool shaft pin 48 by means of a reel handle pin 36, normally positioned in the spool shaft pin 48, and can be quickly and easily removed to secure and remove the reel handle 40 to and from the spool 33. The reel handle 40 is further characterized by a grip 41, which is rotatably mounted on a grip pin 44, carried by the handle arm 42. As further illustrated in FIG. 5, a spool shaft aperture 38 is provided in the spool shaft 37 to secure one end of the fishing line 45 to the spool shaft 37, for winding a supply of fishing line 45 on the spool shaft 37.

Referring now to FIGS. 7 and 8 of the drawings, in a most preferred embodiment of the invention the fishing rod 2 is hollow and is provided with multiple line guides 6, having line guide apertures 7 in the center thereof, located inside the rod bore 8. Accordingly, the fishing line 45 is permitted to freely extend from the spool 33 through the front cap aperture 39 in the front cap 23 and an aperture in the rod mount base 10 (not illustrated) in the reel mount 9, and then through the rod bore 8 and the line guide apertures 7 in the line guide 6, and through the aperture (not illustrated) in the rod tip 3 to extend from the end of the fishing rod 2 for attachment to a lure. As further illustrated in FIGS. 1 and 10, in another most preferred embodiment of the invention a small light 47 can be plugged into one set of plug receptacles 12, located in the rod mount base 10 or handle base 11 to provide illumination for night fishing, as desired.

Referring to FIGS. 3 and 6, in another preferred embodiment of the invention the reel pod 20 is secured on the reel mount 9 by means of mount bolts 14, which extend from the mount plate 13 through the reel mount 9, and threadably engage the threaded mounting apertures 25, provided in the bottom of the housing 21, as illustrated in FIG. 6. Furthermore, the electric motor 28 and cooperating spool 33 are secured inside the housing 21 by extending the rear one of the mount bolts 14 into a threaded aperture (not illustrated) in the electric motor 28.

In operation, the fishing rod assembly 1 of this invention is utilized as follows. Referring again to the drawing, when it is desired to place a quantity of fishing line 45 on the spool 33 located inside the reel pod 20, the mount plate 13, illustrated in FIG. 3, is initially removed from reel mount 9 by removing the mount bolts 14, to release the reel pod 20. The reel pod 20 is then tilted upwardly from its position cradled in the reel mount 9 and the front cap 23 is threadably removed from housing 21, to expose the spool 33. The reel handle pin 36, outside pin 51 and inside pins 52 are then removed from the spool shaft pin 48, and the spool shaft pin 48 is slipped from the shaft pin aperture 35 in the spool shaft 37, and through one of the housing apertures 26 in the housing 21. Since the rear one of the mount bolts 14 extends through the cooperating and registering one of the mounting apertures 25 in the housing 21 and threadably engages an aperture in the electric motor 28, as heretofore described, removal of this rear one of the mount bolts 14 permits the removal of the electric motor 28 and spool 33 from the interior of the housing 21, as illustrated in FIG. 4. Accordingly, when the spool 33 is in the position illustrated in FIG. 4, one end of a supply of fishing line 45 is threaded first through the rod tip 3 and the rod bore 8 of fishing rod 2, and subsequently through each one of line guides 6. The fishing line 45 is then threaded through the aperture in the rod mount base 10 and the front cap aperture 39 in the front cap 23, to project through the spool shaft aperture 38 in the spool shaft 37, and permit winding of the fishing line 45 on spool shaft 37. It will be appreciated by those skilled in the art that in some instances, it is expedient to use a straight length of relatively stiff wire to thread the end of the fishing line 45 through the rod tip 3 and each one of the line guide apertures 7 in the interior of the fishing rod 2, in order to more quickly and easily project the fishing line 45 through the entire length of the fishing rod 2. When one end of the fishing line 45 is secured to the spool shaft 37, the spool 33 and the electric motor 28 are then reinserted inside the housing 21 and the rear cap 27, with the threaded aperture in the electric motor 28 facing downwardly. The spool shaft pin 48 is then reinserted in the aligned housing apertures 26 and shaft pin aperture 35 and the reel handle pin 36, outside pin 51 and inside pins 52 are again fitted through the outside pin apertures 49 and inside pin apertures 50, respectively, in the spool shaft pin 48. The front cap 23 is again threadably secured to the front end of the housing 21, and the reel pod 20 is then reinserted in the reel mount 9 with the mounting apertures 25 facing downwardly. The mount plate 13 is repositioned beneath the reel mount 9 and the mount bolts 14 are reinserted through the mount plate 13 in engagement with the mounting apertures 25 and the aperture in the electric motor 28. Tightening of the mount bolts 14 again secures the reel pod 22 to the reel mount 9. It will further be appreciated by those skilled in the art that when the reel pod 20 is removed from the cradled position in the reel mount 9, the electric wiring (not illustrated) which extends through the rear cap aperture 46 and connects to the switch 18 and either a battery or a source of alternating current which is plugged into one of the plug receptacles 12, as hereinafter described, is not disturbed or removed. After reassembly of the reel pod on the reel mount is completed, the switch 18 is activated and the line 45 wound on the spool shaft 37 of the spool 33.

When a lure is tied onto the free end of the fishing line 45 which projects from the rod tip 3 and a source of electric power is plugged into one of the plug receptacles 12, the fishing rod assembly 1 is ready for use. When the lure is to be cast, the rod is manipulated in conventional manner, and as the rod tip is whipped forwardly pursuant to completion of the cast, assuming that the fishing line 45 is wound on the spool 33 in the clockwise direction, the switch 18 is manipulated to the forward position, in order to energize the electric motor 28 and cause the spool 33 to rotate in the clockwise direction on the spool shaft pin 48, to aid in paying off line from the spool shaft 37. It will be appreciated that this operation of the electric motor 28 functions not only to aid in the casting of the lure in conventional fashion, but also to allow the lure to simply drop from the rod tip 3 by rotation of the spool 33, when the rod 2 is held over the side of a boat or the end of a pier or wharf. When the lure has been deployed a sufficient distance away from the rod tip 3, the switch 18 is manipulated to the middle position, which stops the rotation of the spool 33 and, thus, the paying out of fishing line 45 from the spool 33. When it is desired to retrieve the lure, the switch 18 is manipulated rearwardly from the middle or stop position, to cause the spool 33 to rotate in the counter-clockwise direction and begin accumulating line on the spool shaft 37, to bring the lure closer to the rod tip 3. When the lure approaches the rod tip 3, winding of the line on the spool shaft 37 can be terminated by again manipulating the switch 18 to the middle, or stop position.

Referring again to FIG. 5 of the drawing, in a most preferred embodiment of the invention, the lure can be retrieved conventionally by using a reel handle 40 in lieu of or in addition to activation of the electric motor 28. Accordingly, it will be appreciated that the reel handle pin 36 can first be removed from the spool shaft pin 48, the handle shaft 43 of the reel handle 40 then inserted through the housing aperture 26 and over the projecting end of the spool shaft pin 48, and the reel handle pin 36 then inserted in a cooperating aperture provided in the handle shaft 43, which aperture registers with the outside pin aperture 49, to removably secure the reel handle 40 to the spool 33. When the reel handle 40 is secured in this manner, it can be used to easily retrieve the lure by winding the fishing line 45 on the spool shaft 37 of spool 33, and it can remain in that position as the lure is cast or otherwise deployed, using the electric motor 28, as heretofore described. Furthermore, during periods of load on the fishing line 45 such as in the landing of a fish, or when the lure is retrieved rapidly, the electric motor 28 may be utilized as an assist in manually retrieving the lure by operation of the reel handle 40.

In yet another preferred embodiment of the invention, and referring again to FIGS. 1 and 10 of the drawing, the light 47 can be quickly and easily inserted in one of the plug receptacles 12 mounted on the reel mount 9, to illuminate the general area around the reel mount 9 and handle 16, for night fishing. It will be appreciated that the light 47 is useful for such purposes as tying lures on the fishing line 45, making adjustments in the fishing rod assembly 1 as is deemed necessary, and selecting the desirable lure for a specific type of fishing at night, in non-exclusive particular.

It will be further appreciated by those skilled in the art that the fishing rod assembly of this invention is characterized by convenience and flexibility, in that it can be operated in fully automatic or in combination manual and automatic mode, using the reel handle 40, as desired. The reel handle 40 can also be provided with finger grips similar to the handle grip 17, as desired. Furthermore, the fishing rod 2 can be of substantially any desired length and thickness, and can either be permanently mounted on the reel mount 9 by means of the rod mount 5, or it can be removably mounted thereon, according to the knowledge of those skilled in the art. The fishing rod 2 can also be telescoping in function and can be designed for the insertion of various lengths to lengthen or shorten the rod, as desired. Similarly, and referring again to FIGS. 1-3 and FIG. 6, it will be recognized that the reel pod 20 can be of substantially any length and diameter which is sufficient to accommodate an electric motor 28 and a cooperating spool 33 of sufficient size and power to achieve the desired forward and reverse rotational speed of the spool 33 during casting and retrieval of a specific lure. As heretofore described, the fishing rod assembly 1 can be operated by means of direct current using batteries which are either provided in the hollow interior of the handle 16 by removing the handle cap 19, or in an external battery case which can be held or worn on the belt of a user and connected by means of wiring to the direct current electric motor 28, or by a larger battery which is simply placed adjacent the user with a sufficiently long connecting cord to allow freedom of use from the fishing rod assembly 1. Alternatively, the electric motor 28 can be chosen such that alternating current is used to drive it, and conventional alternating current plugs can be mated with plug receptacles 12 in the reel mount 9 or in an alternative position in the handle cap 19, FIG. 11, in order to energize the motor. As in the case of direct current operation, the wiring attaching the alternating current plug to the source of power must be sufficiently long to allow freedom of use of the fishing rod assembly 1.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A fishing rod assembly comprising:
   (a) reel mount means having a rod mount base at one end and a handle base at the opposite end;
   (b) hollow, flexible, elongated rod means carried by said rod mount base of said reel mount means;
   (c) a handle carried by said handle base of said reel mount means, and switch means cooperating with said handle;
   (d) an electric motor in electrical cooperation with said switch means and spool means in driven relationship with said electric motor, with said electric motor and said spool means removably carried by said reel mount means for extending and retrieving a fishing line wound on said spool means and projecting through said rod means when said electric motor and said switch means are connected to a source of electric current; and
   (e) a housing enclosing said electric motor and said spool means, with front and rear end caps closing said housing, respectively, and a front aperture in said front end cap to provide access for the fishing line, and a rear aperture in said rear end cap to provide access for electric wiring to energize said electric motor.

2. The fishing rod assembly of claim 1 further comprising reel handle means removably attached to said spool means for manually extending and retrieving the fishing line.

3. The fishing rod assembly of claim 1 further comprising at least one first electrical receptacle in said reel mount means.

4. The fishing rod assembly of claim 1 further comprising;
   (a) reel handle means removably attached to said spool means for manually extending and retrieving the fishing line; and
   (b) at least one first electrical receptacle in said reel mount means.

5. The fishing rod assembly of claim 4 wherein said handle is hollow and further comprising a handle cap closing said handle and a second electrical receptacle in said handle cap.

6. The fishing rod assembly of claim 4 wherein said handle is hollow and further comprising:
   (a) a handle cap closing said handle, and a second electrical receptacle in said handle cap.

7. The fishing rod assembly of claim 1 further comprising a drive bevel gear carried by said electric motor; a spool shaft pin rotatably carrying said spool means; and a spool bevel gear on said spool means, said spool bevel gear provided in engagement with said drive bevel gear, whereby activation of said electric motor causes rotation of said spool means on said spool shaft pin.

8. The fishing rod assembly of claim 4 wherein said handle is hollow and further comprising:
   (a) a handle cap closing said handle, and a second electrical receptacle in said handle cap; and
   (c) a drive bevel gear carried by said electric motor; a spool shaft pin rotatably carrying said spool means; and a spool bevel gear on said spool means, said spool bevel gear provided in engagement with said drive bevel gear, whereby activation of said electric motor causes rotation of said spool means on said spool shaft pin.

9. The fishing rod assembly of claim 4 wherein said at least one first electrical receptacle is a pair of first electrical receptacles in said rod mount base and said handle base, respectively.

10. The fishing rod assembly of claim 4 further comprising a mount plate and a pair of mount bolts extending through said mount plate and said reel mount means to threadably engage said housing, at least one of said mount bolts also engaging said electric motor to secure said electric motor in said housing and said housing on said reel mount means.

11. The fishing rod assembly of claim 4 wherein said handle is hollow and further comprising:
   (a) a handle cap closing said handle, said handle cap provided with a second electrical receptacle;
   (c) a drive bevel gear carried by said electric motor; a spool shaft pin rotatably carrying said spool means; and a spool bevel gear on said spool means, said spool bevel gear provided in engagement with said drive bevel gear, whereby activation of said electric motor causes rotation of said spool means on said spool shaft pin; and
   (d) a mount plate and a pair of mount bolts extending through said mount plate and said reel mount means to threadibly engage said housing, at least one of said mount bolts also engaging said electric motor to secure said electric motor in said housing and said housing on said reel mount means.

* * * * *